Feb. 4, 1969　　　L. R. CHRISTENSEN　　　3,425,134
SET-UP GAGE FOR PUNCH PRESS, ETC.
Filed April 17, 1967　　　　　　　　　Sheet 1 of 2

Inventor:
Louis R. Christensen
By Darbo, Robertson & Vandenburgh
Attys.

Feb. 4, 1969   L. R. CHRISTENSEN   3,425,134
SET-UP GAGE FOR PUNCH PRESS, ETC.
Filed April 17, 1967

Inventor:
Louis R. Christensen
By Darbo, Robertson & Vandenburgh
Attys.

United States Patent Office 3,425,134
Patented Feb. 4, 1969

3,425,134
SET-UP GAGE FOR PUNCH PRESS, ETC.
Louis R. Christensen, 21319 E. Cienega,
Covina, Calif. 91722
Filed Apr. 17, 1967, Ser. No. 631,201
U.S. Cl. 33—185                                    10 Claims
Int. Cl. B27g 23/00

ABSTRACT OF THE DISCLOSURE

A set-up gage for determining the proper position of the side guides on a punch press with respect to the center line of a punch. A group of movable plates are provided for positioning a plate which has a pair of abutments positioned normal to each other. These abutments fit about sides of the punch and are used to set the position of the center line of the tool.

BACKGROUND OF THE INVENTION

In many operations in a business such as a machine shop which, for example, uses a punch press or a drill, it is necesasry that there be a very precise setting of the center line of a tool with respect to two side guides on the machine embodying the tool. Take, for example, a punch press which is going to be used to produce holes in a plurality of metal sheets, with the holes being located at a first distance from one side of the sheet and at a seocnd distance from an adjacent side of the sheet. The specifications call for these dimensions to be accurate within very close tolerances. In preparing to do the job the machine operator must set his side guides at these dimensions from the center line of the punch on the punch press. This is a relatively simple operation if great precision is not required, but if the tolerances are very small it becomes a costly job to get the guides set exactly right. The principal object of the present invention is to provide a set-up gage by which such an operation can be quickly and accurately performed.

SUMMARY OF THE INVENTION

The present invention relates to a set-up gage for quickly and accurately obtaining X and Y dimensions between a center line of a tool and two side edges of the gage respectively.

DESCRIPTION OF THE PREFERRED EMBODIMENT

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, of combinations in which the inventive concepts are found.

Figure 6:
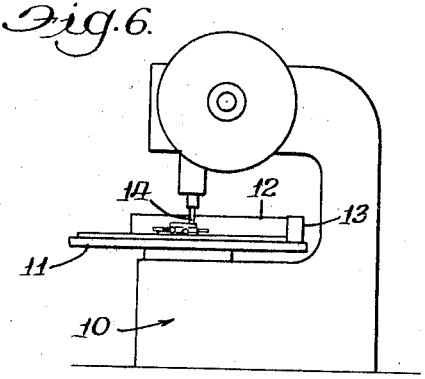
FIGURE 6 is an elevational view of a punch press illustrating the use of the present invention therewith.

In describing the specific embodiment and its use, reference will be made to a punch press which is illustrated generally at 10 in FIGURE 6. It includes a table or platen 11 on which the sheets of metal to be punched are placed. A pair of guides 12 and 13 are provided. These guides are movable across the top of table 11 and can be fixed in place at any desired location thereon. When the guides are fixed in place, one side of the sheet of metal is butted against guide 12 and the other side is butted against guide 13 (the two guides being at right angles to each other). Then when the press is operated, punch 14 perforates the metal at a location which is a given distance from the two guides 12 and 13. The set-up gage of the present invention is to assist in the positioning of guides 12 and 13 so that they will be the correct distances respectively from the (vertical) center line of punch 14.

Figure 4:
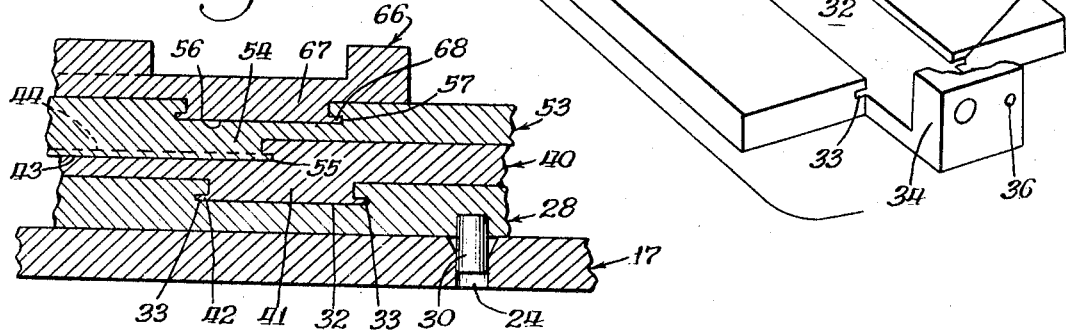
FIGURE 4 is a partial section as viewed at line 4—4 of FIGURE 1.

In the illustrated embodiment there is a base plate generally 17 which includes a main portion 18 of aluminum, and two side portions 19 and 20 formed of tool steel. The portions are fastened together with screws 21. Outer face 22 of side portion 19 defines a Y axis, or a zero base line for the X axis, while outer face 23 defines an X axis, or the zero base line for the Y axis. As indicated in FIGURE 4, suitable indicia (inch measurements) are provided along the X and Y axes. At regular intervals with respect to each of the axes (2 inch spacing in the illustrated embodiment) sockets 24 are provided in base plate 17. A series of intermediate holes 25 are also provided at regular intervals.

Overlying base plate 17 is a main plate generally 28 having a pair of downwardly projecting pins 29 and 30 positioned to be received in sockets 24. A screw 31 may be inserted through one of intermediate openings 25 and threaded into a tapped hole in the bottom of main plate 28 to hold the main plate in position, if desired. For many applications, such as that illustrated in FIGURE 6, it will not be necessary to use an attachment such as screw 31 since pins 29 and 30 will be sufficient. However, for an application where base plate 17 was standing in the vertical position, such an attachment would be helpful. In any event, the pins (and screw if employed) for means to connect the main plate to the base plate with a given orientation with respect to the X and Y axes. At the top of main plate 28 is a way 32 having slide slots 33. Way 32 is parallel to the Y axis 22. Main plate 28 includes a side mount 34 which holds a micrometer 35, has an opening 36 and a locking screw 37 threaded into the mount in alignment with opening 36.

Supported on main plate 28 is a first sliding plate generally 40. A downwardly extending portion 41 forms a slide having outwardly projections 42 received in side slots 33. Thus the way 32 and slide 41 form an interconnecting means which allows the first sliding plate 40 to move with respect to the main plate 28 while restricting its movement to a line parallel to the Y axis 22. Across the top of first sliding plate 40 is a way 43 having side slots 44. A side mount 45 holds a micrometer 46. Way 43 and spindle 46a of micrometer 46 are parallel to the X axis 23. Mount 45 has an opening 47 for a locking bar and also carries a locking screw 48 which is in alignment with opening 47. A locking rod 49 is affixed to and forms a part of sliding plate 40, and extends through opening 36 in side mount 34. Side wall 50 in alignment with micrometer spindle 35a forms an anvil for the micrometer.

Figure 5:
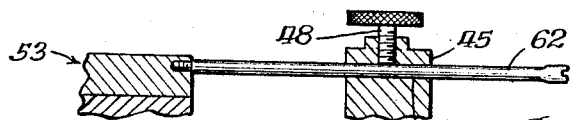
FIGURE 5 is a partial section as viewed at line 5—5 of FIGURE 1.

The second sliding plate generally 53 is mounted on first sliding plate 40. The second sliding plate includes a lower projection forming a slide 54, with side projections 55, received in way 43. The interfitting slide and way forms a means releasably connecting the first and second sliding plates, which means permits the sliding plate 53 to be moved with respect to the sliding plate 40, but only along a line parallel to the X axis 23. The second sliding plate has a way 56 across the top thereof, which way includes side slots 57. Way 56 is at a 45° angle between the X and Y axis. A side mount 58 holds a micrometer 59. The spindle 59a of micrometer 59 is parallel to the X axis. Side mount 58 also has an opening 60 for a locking rod. Opening 60 is parallel to way 56. A locking screw 61 is threaded into mount 55 and intersects opening 60. A locking rod 62 is attached to sliding plate 53 and extends through opening 47 in side mount 45 (see particularly FIGURE 5). A portion of side wall 63 in alignment with spindle 46a of micrometer 46 forms an anvil for that micrometer.

At the top of the stack is the third sliding plate generally 66. It includes a slide 67 having projections 68 on the under side thereof and engaging in way 56. An extension of the slide forms arm 69 having holes 70 therein. Plate 66 includes a shelf 71 having a right angled notch which forms two abutments 72 and 73. One of these abutments, namely 72, is parallel to Y axis 22, while abutment 73 is parallel to X axis 23. At the rear side of the shelf are two more abutments, 74 and 75. Again, these are positioned at right angles to each other, with one parallel to the X axis and the other parallel to the Y axis. A portion of side wall 76 is aligned with spindle 59a and forms an anvil for the micrometer 59. A post 77 has a downwardly projecting pin 78, which is inserted into one of holes 70 to hold the post in place. Post 77 has a locking screw 79. A locking rod 80 secured to plate 66 extends through holes 60 in side mount 58 of the second sliding plate 53.

While various forms of calibration of the micrometers and reference points could be employed, a specific one is illustrated and described herein for the purpose of complying with the laws relating to disclosure. However, it will be apparent to those skilled in the art, from this described embodiment, how various other forms of calibration and reference points could be used.

OPERATION

In the illustrated embodiment if pins 29 and 30 are inserted into holes 24a and 24b, then corner 84 of main plate 28 will coincide with corner 85 of base plate 17. As will be apparent, corner 85 is the intersection of the X and Y axis and is the zero point on the indicia scales along the sides of the base plate. For the purposes of convenience, corner 84 of main plate 28 will be referred to as a base point or a zero point. If micrometers 35, 46 and 59 are all set at zero, corner 86 between abutments 72 and 73 also will lie on the zero point, i.e. coincide with corner 84.

Now if a tool 14 having a radius of ¼ inch were to be mounted with its vertical axis 14a conciding with corners 24 and 85, the two micrometers 35 and 46 would be left at zero, i.e. there would be no movement of the center line away from the X or Y axes. However, micrometer 59 would be rotated so that its spindle 59a was withdrawn by ¼ of an inch. Then manually the third sliding plate 66 would be moved in its ways until wall 76 again abutted micrometer spindle 59a. Because of the 45° positioning of the ways 56, the center line 14a of the tool 14 would be moved along the X axis a distance of ¼ inch and at the same time a distance along the Y axis ¼ inch.

When tool 14 having a radius about the center line of ¼ inch is brought into contact with abutments 72 and 73 (or the abutments brought against the tool by moving base plate 17) the axis 14a of the tool will coincide with the zero point 85. Similarly, if tool 14a had a radius of ½ inch and spindle 59a were moved ½ inch away from zero (and the wall 76 brought into contact with the spindle), the two abutments 72 and 73 would each have moved ½ inch away from the zero point so that with the tool fitting against these two abutments its vertical axis still will coincide with the zero point 85.

Abutments 74 and 75 are to accommodate tools 14 having a radius larger than can be accommodated by the maximum movement of micrometer 59. Thus the distance between abutment 72 and abutment 74 equals the distance between abutment 73 and abutment 75, the distance being 1 inch in the illustrated embodiment. Thus if corner 86 is positioned at the zero point, i.e. coincides with corner 24, and a tool having a 1 inch radius is brought into contact with abutments 74 and 75, that tool will have its vertical axis at the zero point. Now if a tool having a 1½ inch radius is to be employed, spindle 59a is moved back ½ inch and abutments 74 and 75 used against the sides of the tool.

Figure 1:
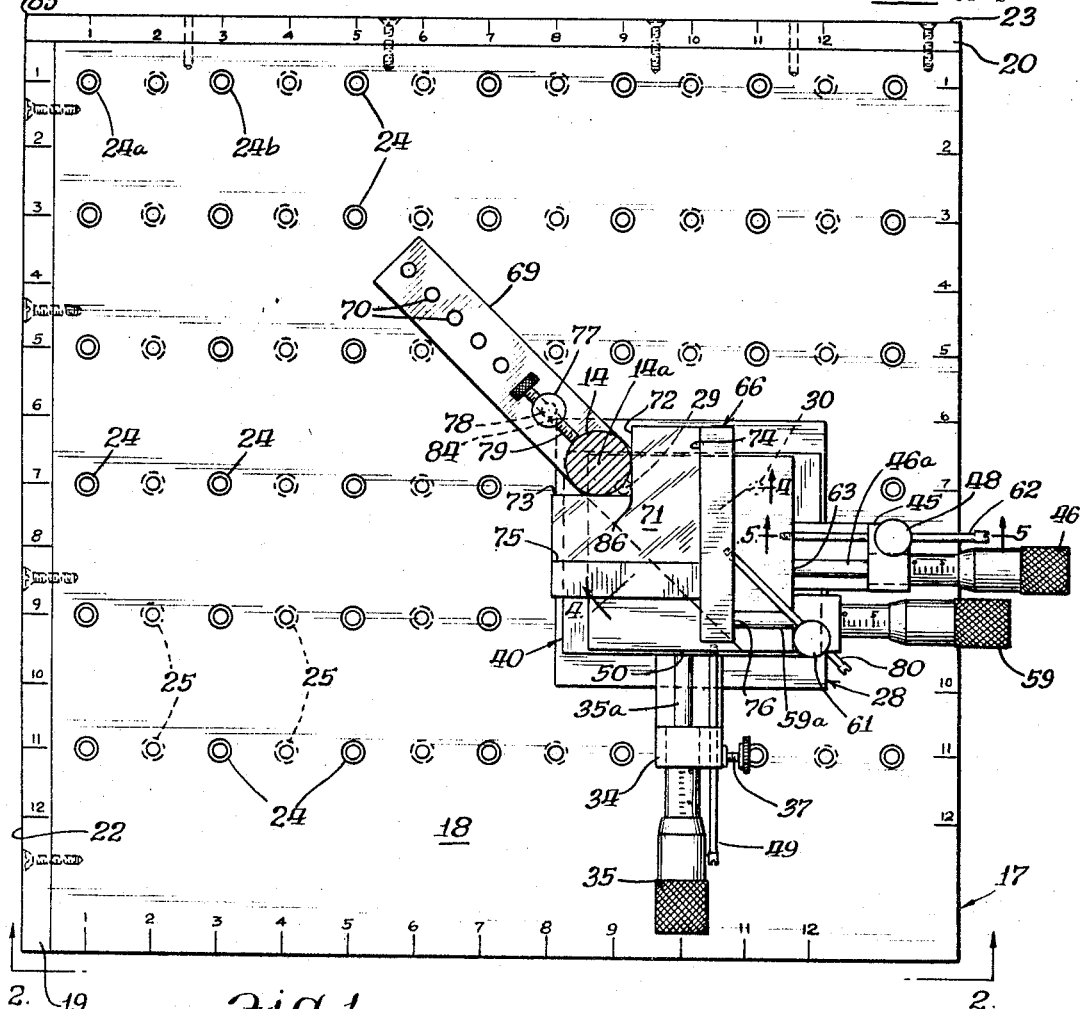
FIGURE 1 is a plan view of an embodiment of the invention.
Figure 2:
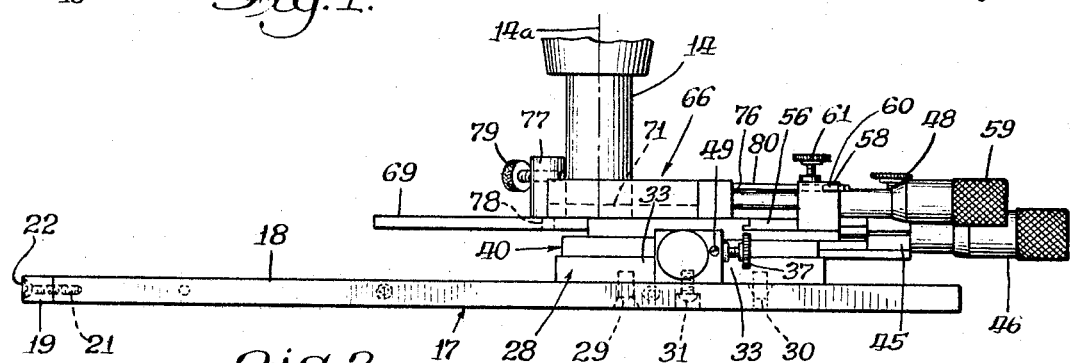
FIGURE 2 is an elevational view as seen at line 2—2 of FIGURE 1.

Now assume that guides 12 and 13 of punch press 10 are to be positioned 8 and 6 inches respectively from the center line of a tool 14 which has a radius of ½ inch. With all of the micrometers set at zero, main plate 28 would be mounted in the position illustrated in FIGURE 1 on base plate 17. In this position it will be seen that corner 84 is 8 inches from Y axis 22, and 6 inches from X axis 23. Now if micrometer 59 is operated so as to retract spindle 59a by ½ inch, and the third slide plate 66 moved accordingly, abutments 72 and 73 each will be ½ inch from corner 24. If abutments 72 and 73 now are brought against the sides of tool 14, the center line 14a will coincide with corner 24, X axis 23 will be 6 inches from the center line 14a, while Y axis 22 will be 8 inches from that center line. The two guides 12 and 13 are then moved against the sides 22 and 23 respectively of the base plate 17 and locked in place on the punch press 10. The gage of the present invention is removed and the punch press is set up ready for operation. In making such a set-up the locking screw 79 normally would not be employed.

Now assume that center line 14a was to be 8⅝ inches from the Y axis 22 and 6⅝ inches from the X axis 23. To achieve this micrometer 35 would be operated so that its spindle 35a was retracted by ⅝ of an inch thus increasing the distance of the center line 14a to 6⅝ inches from X axis 23. Similarly, micrometer 46 would be operated so that its spindle 46a was retracted ⅝ of an inch. This would retract center line 14a ⅝ of an inch further along the X axis and increase the distance between the center line and the Y axis to 8⅝ inches. To insure that no error be inadvertently introduced, after all of the micrometers were set, the respective sliding plates would be moved back against the micrometer spindles and then locking screws 37, 48 and 61 locked onto locking rods 49, 62 and 80 respectively to hold the sliding plates in place while the remainder of the set-up was being accomplished.

Figure 7:
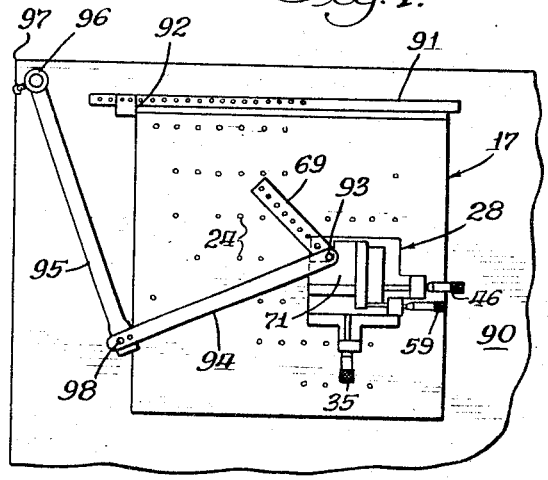
FIGURE 7 is a plan view of the use of the invention in making a set-up on a bench.
Figure 3:
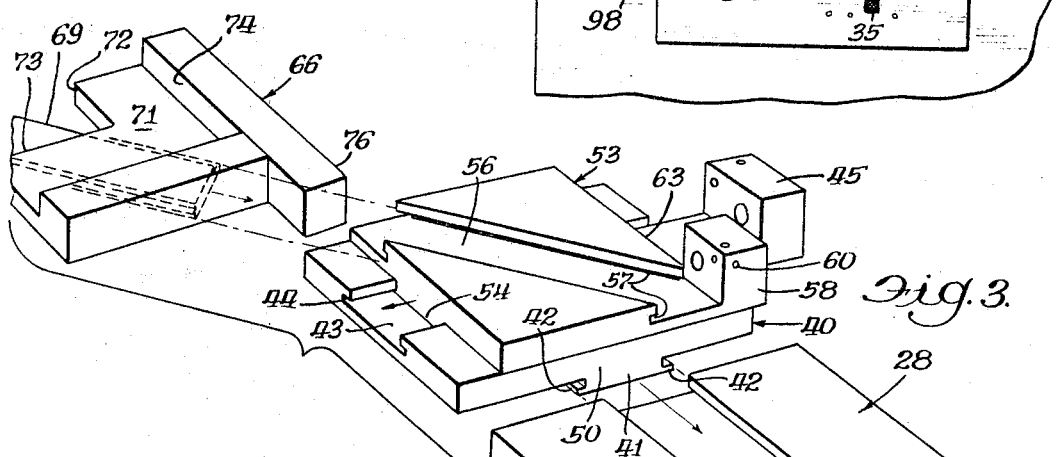
FIGURE 3 is a partially exploded view with portions removed.

While the principal application of the embodiments of the present invention will be in connection with machine tools, it does have other uses. For example, illustrated in FIGURE 7 is a set-up on a bench 90 wherein a straight edge 91 defines the X axis and the side of adjustable stop 92 defines the Y axis. A marking member 93 (which is herein referred to as a tool) on the end of arm 94, jointed to arm 95, is to be set at a given position with respect to the X and Y axes. Once the distances have been set up on the gage, as heretofore described, arm 95 is locked onto posts 96 by means of set screw 97, and joint 98 between the two arms is immobilized so that marking member 93 is now locked into position. The set-up gage 17, 28, etc., may now be removed and marking member 93 is positioned the required distances from the X and Y axes.

I claim:
1. A set-up gage for use with a punch press or the like having a tool thereon with a center line normal to a face, said gage including a base plate positionable on said face and defining an X axis with respect to the face, a Y axis with respect to the face, an X axis base line, and a Y axis base line; a main plate having a base point; first means for releasably connecting the main plate to the base plate at a plurality of positions on the base plate at various increments of distances from said base lines but always at the same orientation with respect to the X and Y axes; a first sliding plate mounted on the main plate; second means interconnecting the first sliding plate and the main plate to permit the first sliding plate to move with respect to the main plate while restricting its path of movement to a line parallel to a first of said axes; a second sliding plate mounted on the first sliding plate; third means interconnecting the first and the second sliding plates to permit the second sliding plate to move with respect to the first sliding plate while restricting the path of movement of the second sliding plate to a line parallel to the second of said axes; first measuring means associated with the main plate and the first sliding plate to determine the position of the first sliding plate along said one axis from the base point on main plate; second measuring means associated with the first and the second sliding plates to determine the position of the second sliding plate along said second axis from the base point on the main plate; and a device mounted on the second sliding plate to indicate the center line of the tool.

2. A gage as set forth in claim 1, wherein said device includes a third sliding plate; fourth means interconnecting the second and the third sliding plates to permit the third sliding plate to move with respect to the second sliding plate while restricting the path of movement of the third sliding plate to a line oriented at 45° with respect to the X and Y axes; and third measuring means associated with the second and third sliding plates to determine the position of the third sliding plate along one of said axes with respect to said base point.

3. A gage as set forth in claim 2, wherein said first means connecting said base plate and said main plate includes a plurality of projection portions on one of the two respective plates and a plurality socket portions on the other of the two plates, said portions on the base plate being evenly spaced with respect to said two axes; and said second, third and fourth means each includes a way on one of the two respective plates and a slide on the other of the two respective plates and engaged in the way.

4. A gage as set forth in claim 3, wherein said device includes two abutments adjacent to and oriented at 90° with respect to each other, one of said abutments being parallel to the X axis and the other parallel to the Y axis.

5. A gage as set forth in claim 4, wherein each measuring means includes a micrometer having a spindle, said micrometer being affixed to one of the two respective plates, and a part of the other of the two respective plates forming an anvil aligned with the spindle; and wherein there is a releasable position affixing means interconnecting the main plate and the first sliding plate, a releasable position affixing means interconnecting the first sliding and the second sliding plates, and a releasable position affixing means interconnecting the second and the third sliding plates.

6. A gage as set forth in claim 2, wherein said device includes two abutments adjacent to and oriented at 90° with respect to each other, one of said abutments being parallel to the X axis and the other parallel to the Y axis.

7. A gage as set forth in claim 1, wherein said first means connecting said base plate and said main plate includes a plurality of projection portions on one of the two respective plates and a plurality socket portions on the other of the two plates, said portions on the base plate being evenly spaced with respect to said two axes; and said second, third and fourth means each includes a way on one of the two respective plates and a slide on the other of the two respective plates and engaged in the way.

8. A gage as set forth in claim 7, wherein said device includes two abutments adjacent to and oriented at 90° with respect to each other, one of said abutments being parallel to the X axis and the other parallel to the Y axis.

9. A gage as set forth in claim 1, wherein each measuring means includes a micrometer having a spindle, said micrometer being affixed to one of the two respective plates, and a part of the other of the two respective plates forming an anvil aligned with the spindle, said device indicating said center line coincides with said base point when all of said micrometers read zero.

10. A gage as set forth in claim 9, wherein there is a releasable position affixing means interconnecting the main plate and the first sliding plate, a releasable position affixing means interconnecting the first sliding and the second sliding plates, and a releasable position affixing means interconecting the second and the third sliding plates.

References Cited

UNITED STATES PATENTS 2,369,425    2/1945    Becker.
2,782,520    2/1957    Amend.
3,108,508    10/1963    Warden.

WILLIAM D. MARTIN, JR., *Primary Examiner.*

U.S. Cl. X.R.

33—167, 174